United States Patent
Reddy et al.

(12)

(10) Patent No.: US 6,468,936 B1
(45) Date of Patent: Oct. 22, 2002

(54) SOLID MAO/METALLOCENE CATALYST COMPLEX FOR PROPYLENE POLYMERIZATION

(75) Inventors: Baireddy Raghava Reddy, Baytown; Edwar Shoukri Shamshoum, Houston, both of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 08/055,267

(22) Filed: Apr. 28, 1993

(51) Int. Cl.$^7$ ................................. B01J 31/00
(52) U.S. Cl. ..................... 502/103; 502/105; 502/117
(58) Field of Search ................. 502/103, 105, 502/117

(56) References Cited

U.S. PATENT DOCUMENTS

| | | | | |
|---|---|---|---|---|
| 4,752,597 A | * | 6/1988 | Turner | 502/103 |
| 4,769,510 A | * | 9/1988 | Kaminsky et al. | 502/103 |
| 4,791,180 A | * | 12/1988 | Turner | 502/103 |
| 4,808,561 A | * | 2/1989 | Welborn, Jr. | 502/117 |
| 4,892,851 A | * | 1/1990 | Ewen et al. | 502/103 |
| 5,043,515 A | * | 8/1991 | Slaugh et al. | 502/117 |
| 5,126,303 A | * | 6/1992 | Resconi et al. | 502/103 |
| 5,317,036 A | * | 5/1994 | Brady, III et al. | 523/223 |

FOREIGN PATENT DOCUMENTS

EP    226463   * 6/1987

* cited by examiner

Primary Examiner—Walter D. Griffin
(74) Attorney, Agent, or Firm—Jim D. Wheelington; Bradley A. Misley

(57) ABSTRACT

The catalyst is a mixture of metallocene catalyst component of the general formula:

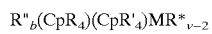

where R" is a bridge imparting stereorigidity to the structure to the metallocene by connecting the two cyclopentadienyl rings, b is 0 or 1, Cp is a cyclopentadienyl ring, R and R' are substituents on the cyclopentadienyl rings and can be a hydride or a hydrocarbyl from 1–9 carbon atoms, each R and R' being the same or different, each $(CpR_4)$ and $(CpR'_4)$ being the same or different, M is a Group IIIB, IVB, VB or VIB metal, R* is a hydride, a halogen or a hydrocarbyl from 1–20 carbon atoms, v is the valence of M and an aluminoxane co-catalyst in a solvent. The solvent is removed from the mixture of metallocene and aluminoxane to form a solid. The solid mixture is ground and delivered into a reactor in a mineral oil slurry.

33 Claims, No Drawings

SOLID MAO/METALLOCENE CATALYST COMPLEX FOR PROPYLENE POLYMERIZATION

BACKGROUND OF THE INVENTION

1. Field of the Invention

This invention relates to a catalyst for the polymerization of olefins, a method of making the catalyst and a method of polymerization using the catalyst, more particularly, a solid catalyst comprising a mixture of an aluminoxane and a metallocene and the related method of making and using such a catalyst.

2. Description of the Prior Art

Catalysts for the polymerization of olefins containing a metallocene and an aluminoxane are known Examples of such catalysts are disclosed in several patents.

U.S. Pat. No. 3,242,099 disclosed a metallocene [bis(cyclopentadienyl)titanium dichloride] and an oligomeric aluminum compound [(R—Al—O)] as a catalyst for olefin polymerization.

U.S. Pat. No. 4,542,199 disclosed a bis(cyclopentadienyl) transition metal alkylhalide with an aluminoxane as a catalyst for the polymerization and copolymerization of ethylene.

U.S. Pat. No. 4,769,510 disclosed a chiral stereorigid zirconocene with an aluminoxane as a catalyst for the polymerization of propylene.

U.S. Pat. No. 4,791,180 disclosed a reaction product between a metallocene and alumoxane to form a solid catalyst for the polymerization and copolymerization of ethylene.

U.S. Pat. No. 4,892,851 disclosed a combination of aluminoxane with a bridged metallocene in which one cyclopentadienyl ring is substituted in a substantially different manner from another cyclopentadienyl ring. This combination generated a highly syndiospecific catalyst which produced highly crystalline syndiotactic polyolefin.

U.S. Pat. Nos. 4,752,597 and 4,791,180 disclosed an olefin polymerization catalyst and a polymerization process for polymers of ethylene and copolymers of ethylene and alpha-olefins. The metallocenes disclosed are unbridged which would not be effective for propylene polymerization. The aluminum to transition metal molar ratio was about 12:1 to about 100:1. The metallocene was reacted with a pentane solution of MAO, i.e., a low molecular weight fraction of MAO, to produce a solid which was dissolved in toluene for polymerization of ethylene.

U.S. Pat. No. 5,122,491 disclosed a catalyst produced by a reaction product of solid MAO precipitated with n-decane from a toluene solution, i.e., a high molecular weight fraction of MAO, with a metallocene in toluene to which an organoaluminum compound is added. This catalyst is useful for polymerization of olefins, especially ethylene and 4-methyl-1-pentene.

European Patent Application 88900586.4 (Publication No. 0327649) disclosed a solid catalyst for olefin polymerization composed of a metallocene and an alumoxane and having an average particle diameter of 5 to 200 micrometers and a specific surface area of 20 to 1000 m²/g. An aluminoxane suspension in a solvent such as n-decane is contacted with a solution of a metallocene in a solvent such as toluene to form a solid catalyst which was used for polymerization of ethylene and ethylene copolymer.

Two of the most serious process problems standing in the way of commercialization of metallocene based technology for olefin polymerization are low polymer bulk densities and severe reactor fouling. The bulk densities for either syndiotactic or isotactic polypropylene obtained with metallocene systems range from 0.10 g/cc upwards. The low bulk density problem appears to be more severe for syndiotactic polypropylene (SPP) than for isotactic polypropylene (IPP). The bulk densities of IPP with conventional titanium (IV) based heterogeneous Ziegler-Natta catalysts are in the range 0.40–0.50.

Reactor fouling, defined as the tendency of the polymer to stick to the surface of the reactor components, is also very severe with metallocene based catalyst systems. The reactor fouling necessitates extraction of the reactor components with a solvent thus adding to the cost of polymer production and makes the process more elaborate. It is not clear how interdependent the high degree of reactor fouling and low polymer bulk densities are.

It would be advantageous to have a metallocene catalyst and a process for using the catalyst which reduces reactor fouling and gives a polymer having high bulk density. Further, it would be advantageous if such a process were effective for both isospecific and syndiospecific polymerization.

SUMMARY OF THE INVENTION

Accordingly, the present invention provides a catalyst for the polymerization of olefins which reduces reactor fouling and gives a polymer having high bulk density.

This and other objects are accomplished by a solid catalyst comprising:

a) a metallocene of the general formula:

$$R''_b(CpR_4)(CpR'_4)MR^*_{v-2}$$

where R" is a bridge imparting stereorigidity to the structure of the metallocene by connecting the two cyclopentadienyl rings, b is 0 or 1, Cp is a cyclopentadienyl ring, R and R' are substituents on the cyclopentadienyl rings and can be a hydride or a hydrocarbyl from 1–9 carbon atoms, each R and R' being the same or different, each (CpR₄) and (CpR'₄) being the same or different, M is a transition metal of a Group IIIB, IVB, VB or VIB metal, R* is a hydride, a halogen or a hydrocarbyl from 1–20 carbon atoms, v is the valence of M; and b) an aluminoxane compound of the following general formula:

$$Al_2OR_4(Al(R)-O)_n$$

for a linear aluminoxane and $$(Al(R)-O)_{n+2}$$

for a cyclic aluminoxane, n being 4 to 20 and R being methyl or ethyl.

DETAILED DESCRIPTION OF THE INVENTION

The present invention provides a metallocene catalyst and processes for making and using the catalyst, particularly in the production of crystalline polyolefins, especially polypropylene. Olefins, especially propylene, may be polymerized to form polyolefins in amorphous (atactic) or crystalline forms. Examples of crystalline forms are isotactic and syndiotactic.

Isotactic polypropylene contains principally repeating units with identical configurations and only a few erratic, brief inversions in the chain. Isotactic polypropylene may be structurally represented as

The methyl groups attached to the tertiary carbon atoms of successive monomeric units on the same side of a hypothetical plane through the main chain of the polymer, e.g., the methyl groups are all above or below the plane.

Another way of describing the structure is through the use of NMR. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

A syndiotactic polymer contains principally units of exactly alternating stereoisomers and is represented by the structure:

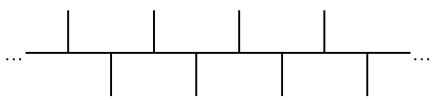

The methyl groups attached to the tertiary carbon atoms of successive monomeric units in the chain lie on alternate sides of the plane of the polymer.

In NMR nomenclature, this pentad is described as . . . rrrr . . . in which each "r" represents a "racemic" dyad, i.e., successive methyl groups on alternate side of the plane. The percentage of r dyads in the chain determines the degree of syndiotacticity of the polymer. Syndiotactic polymers are crystalline and like the isotactic polymers are insoluble in xylene. This crystallinity distinguishes both syndiotactic and isotactic polymers from atactic polymer that is soluble in xylene.

A polymer chain showing no regular order of repeating unit configurations is an atactic polymer. In commercial applications, a certain percentage of atactic polymer is typically produced with the isotactic form.

As noted above, a metallocene compound can be used with an aluminoxane compound to form a catalyst for the polymerization of olefins. The metallocene should contain two cyclopentadiene rings and be of the general formula:

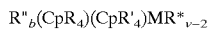

where R" is a bridge imparting stereorigidity to the structure to the metallocene by connecting the two cyclopentadienyl rings, b is 0 or 1, Cp is a cyclopentadienyl ring, R and R' are substituents on the cyclopentadienyl rings and can be a hydride or a hydrocarbyl from 1–9 carbon atoms, each R and R' being the same or different, each (CpR$_4$) and (CpR'$_4$) being the same or different, M is a transition metal of a Group IIIB, IVB, VB or VIB metal, R is a hydride, a halogen or a hydrocarbyl from 1–20 carbon atoms, v is the valence of M. Preferably, b is 1 and R" is a hydrocarbyl radical, more preferably an alkenyl radical having one to four carbon atoms, a dialkyl germanium, a dialkyl silicon, an alkyl phosphine or amine radical, such as a dimethyl silyl radical, an ethylenyl radical or a isopropenyl radical and, most preferably, is an ethylene radical for isospecific metallocene and isopenyl radical for syndiospecific metallocene. Preferably, (CpR$_4$) is cyclopentadienyl or substituted cyclopentadienyl ring such that it is 3-t-butyl-cyclopentadienyl or indenyl and (CpR'$_4$) is a substituted cyclopentadienyl ring such that it is indenyl or fluorenyl. Preferably, M is a Group IVB metal, most preferably zirconium, which has a valence of 4. Preferably, R* is a halogen or alkyl, most preferably chlorine or methyl. Specific examples of metallocenes are isopropyl (fluorenyl)(cyclopentadienyl)zirconium Dichloride, isopropyl(2,7-di-t-butylfluorenyl) (cyclopentadienyl) zirconium dichloride and ethylene bis (indenyl)zirconium dichloride.

The metallocene is combined with an aluminoxane compound of the following general formula:

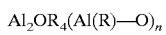

for a linear aluminoxane and

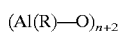

for a cyclic aluminoxane, n being 4 to 20 and R being methyl or ethyl. The preferred aluminoxane is methyl alumoxane (MAO).

The novel catalyst is a mixture of metallocene catalyst component and aluminoxane co-catalyst from which the solvent has been removed to form a solid. Use of this catalyst in olefin polymerization results in increased bulk density of the polyolefin. The new method of polymerization differs from the conventional method of aluminoxane/metallocene catalyzed polymerizations in the mode of introduction of the catalyst into the reactor. Conventionally, the catalyst is reacted with MAO supplied as a solution in a hydrocarbon solvent followed by injection of the resulting homogeneous solution into the reactor containing liquid olefin. In the novel method of making this catalyst, the solvent is removed from the mixture of metallocene and aluminoxane. The solid mixture is ground and delivered into the reactor in a mineral oil slurry. The new catalyst and new methods of making and using the catalyst are applicable to all stereospecific metallocene systems.

Introduction into the reactor of MAO/metallocene mixture as solvent-free solid slurried in mineral oil offers several advantages over the conventional method of using homogeneous solutions for catalyst delivery. Some of the advantages include a) ease of catalyst delivery under plant conditions;

b) Aromatic solvent free polymer fluff;

c) consistently high bulk densities;

d) significant decrease in reactor fouling;

e) minimal post-polymerization reactor cleanup needed;

f) general applicability to all metallocene catalyzed olefin polymerizations;

g) polymer free of conventional inorganic support materials.

The invention having been generally described, the following examples are given as particular embodiments of the invention and to demonstrate the practice and advantages thereof. It is understood that the examples are given by way of illustration and are not intended to limit the specification or the claims to follow in any manner.

Catalyst Preparation

Methyl aluminoxane supplied as a 10% solution in toluene (density 0.93, 4.7% by wt. Al) was used as the cocatalyst. A desired amount of metallocene was dissolved in a fixed volume of MAO solution. The aluminum to transition metal molar ratio was between about 1000:1 to about 4000:1. (In the Tables below, "MAO used" refers to the amount of MAO used for a solid MAO/metallocene catalyst relative to the amount of MAO used for a homogeneous MAO/metallocene catalyst and "MAO std" refers to the amount of MAO used for a homogeneous MAO/metallocene catalyst relative to the amount of MAO used for a solid MAO/metallocene catalyst.) The solvent was removed under high vacuum at room temperature and traces of the remaining solvent were removed with slight warming. The flask was taken into a vacuum Atmospheres dry box; the solid was collected and pulverized to obtain a free flowing powder. A known amount of the solid was weighed out and suspended in mineral oil (Amoco-10NF) in a Wheaton bottle; shaken thoroughly and injected into a stainless steel sample transfer cylinder. Generally, a small amount (estimated to be about 10%) of the solid remained adhered to the glass wall and could not be transferred. It is also likely that small amount of solid remains adhered to the walls of sample transfer cylinder during injection.

Polymerization Procedure

All the polymerizations were run in bulk propylene (1.4L) in a 2 liter, magnedrive, packless Zipperclave reactor. The stainless steel catalyst transfer cylinder containing the mineral oil suspension (except as noted) of solid MAO/metallocene mixture was connected to the reactor containing 0.8–1.0L propylene and the catalyst was charged into the reactor along with 0.4–0.6L propylene. For in situ prepolymerization, the catalyst and the monomer were stirred at 22° C. for 10 minutes and then the temperature was raised to the specified level for polymerization. Stirring at 1200 rpm was started and the temperature was raised to 60° C. within 5 minutes. The stirring was decreased to 300 rpm and the polymerization was run for one hour and maintained at 60° C. (except as noted). The temperature of the reactor was lowered to room temperature. The monomer was vented, the reactor was opened and the polymer fluff was collected. Any polymer ring around the stirrer and baffles was collected separately and weighed. The polymer which stuck to the reactor walls and the stirrer was extracted with toluene at 90° C. and precipitated by the addition of methanol. The precipitated polymer was filtered, dried and weighed. The sum of the polymer obtained from the ring and toluene extraction was defined as fouling. Catalyst efficiencies were defined as grams of polymer per gram of catalyst per hour. Results are summarized in Tables 1–8.

TABLE 1

Effect of MAO Concentration on Polymerizations Using Solid MAO/Metallocene Complex Suspended in Mineral Oil

| RUN | Bomb Contents | Metallocene amt, mg | MAO used/ (MAO std) | Powder Yield, g | Solid Fouling, g | Toluene ext, g | Total Yield, g | % Fouling | Cat. Effic g/g-h | Bulk den. | Tm, C | Mw/1000 (GPC) | MWD (GPC) |
|---|---|---|---|---|---|---|---|---|---|---|---|---|---|
| 1-1 | 250.0 mg solid FFZrCl$_2$/MAO 4.0 ml Mineral Oil | 0.28 | 1.0/(1.0) | 31 | 7 | 9 | 47 | 34 | 168000 | 0.30 | 122 126 133 | 87 | 2.3 |
| 1-2 | 250.0 mg solid FFZrCl$_2$/MAO 4.0 ml Mineral Oil 1.0 ml Hexane | 0.28 | 1.0/(1.0) | 25 | 4 | 6 | 35 | 29 | 125000 | 0.27 | 119 132 | 82 | 2.3 |
| 1-3 | 150.0 mg solid FFZrCl$_2$/MAO 4.0 ml Mineral Oil | 0.56 | 0.3/(1.0) | 70 | 5 | 7 | 82 | 15 | 146000 | 0.29 | 133 | | |
| 1-4 | 150.0 mg solid FFZrCl$_2$/MAO 4.0 ml Mineral Oil | 0.56 | 0.3/(1.0) | 69 | 7 | 5 | 81 | 15 | 145000 | 0.32 | 119 132 | | |
| 1-5 | *100.0 mg solid FFZrCl$_2$/MAO 4.0 ml Mineral Oil | 0.37 | 0.3/(1.0) | 81 | 3 | 6 | 90 | 10 | 243000 | 0.38 | 117 132 | | |
| 1-6 | 100.0 mg FFZrCl$_2$/MAO 4.0 ml Mineral Oil | 0.37 | 0.3/(1.0) | 47 | 0 | 3 | 50 | 6 | 135000 | 0.32 | 131 | | |
| 1-7 | 75.0 mg FFZrCl$_2$/MAO 4.0 ml Mineral Oil | 0.28 | 0.3/(1.0) | 28 | 0 | 3 | 31 | 10 | 111000 | 0.33 | | | |

*Polymerization time was 120 minutes

TABLE 2

Effect of MAO Concentration on Polymerizations Using
Solid MAO/Metallocene Complex Suspended in Mineral Oil

| RUN | Bomb Contents | Metallocene amt, mg | MAO used/ (MAO std) | Powder Yield, g | Solid Fouling, g | Toluene ext, g | Total Yield, g | % Fouling | Cat. Effic g/g-h | Bulk den. | Tm, C | Mw/1000 (GPC) | MWD (GPC) |
|---|---|---|---|---|---|---|---|---|---|---|---|---|---|
| 2-1 | 150.0 mg solid FFZrCl$_2$/MAO 4.0 ml Mineral Oil | 0.56 | 0.74/(1.0)* | 23 | 14 | 15 | 52 | 56 | 92860 | 0.25 | 134 | 96.1 | 5.2 |
| 2-2 | 150.0 mg solid FFZrCl$_2$/MAO 4.0 ml Mineral Oil | 0.56 | 0.74/(1.0)** | 42 | 26 | 18 | 89 | 49 | 159000 | 0.32 | 134 | 92.4 | 4.2 |
| 2-3 | 150.0 mg solid FFZrCl$_2$/MAO 4.0 ml Mineral Oil | 0.56 | 0.3/(1.0) | 70 | 5 | 7 | 82 | 15 | 146400 | 0.29 | 133 | — | |
| 2-4 | 150.0 mg solid FFZrCl$_2$/MAO 4.0 ml Mineral Oil | 0.56 | 0.3/(1.0) | 69 | 7 | 5 | 81 | 15 | 144600 | 0.32 | 132 | — | |

*add 2.5 ml MAO to reactor before bomb injection
**add 2.5 ml MAO to reactor after bomb injection

TABLE 3

Effect of Catalyst Concentration on Polymerizations
Using Solid MAO/Metallocene Complex Suspended in Mineral Oil

| RUN | Bomb Contents | Metallocene amt, mg | MAO used/ (MAO std) | Powder Yield, g | Solid Fouling, g | Toluene ext, g | Total Yield, g | % Fouling | Cat. Effic g/g-h | Bulk den. | Tm, C | Mw/1000 (GPC) | MWD (GPC) |
|---|---|---|---|---|---|---|---|---|---|---|---|---|---|
| 3-1 | 150.0 mg solid FFZrCl$_2$/MAO 4.0 ml Mineral Oil | 0.56 | 0.3/(1.0) | 70 | 5 | 7 | 82 | 15 | 146400 | 0.29 | 133 | | |
| 3-2 | 150.0 mg solid FFZrCl$_2$/MAO 4.0 ml Mineral Oil | 0.56 | 0.3/(1.0) | 69 | 7 | 5 | 81 | 15 | 144600 | 0.32 | 132 | | |
| 3-3 | 100.0 mg solid FFZrCl$_2$/MAO 4.0 ml Mineral Oil | 0.37 | 0.3/(1.0) | 47 | 0 | 3 | 50 | 6 | 134000 | 0.32 | 131 | | |
| 3-4 | 75.0 mg solid FFZrCl$_2$/MAO 4.0 ml Mineral Oil | 0.28 | 0.3/(1.0) | 28 | 0 | 3 | 31 | 10 | 110700 | 0.33 | | | |

TABLE 4

Effect of Method of Catalyst Addition to the Reactor
On Polymerizations Using Solid MAO/Metallocene Complex

| RUN | Bomb Contents | Metallocene amt, mg | MAO used/ (MAO std) | Powder Yield, g | Solid Fouling, g | Toluene ext, g | Total Yield, g | % Fouling | Cat. Effic g/g-h | Bulk den. | Tm, C | Mw/1000 (GPC) | MWD (GPC) |
|---|---|---|---|---|---|---|---|---|---|---|---|---|---|
| 4-1 | 250.0 mg solid FFZrCl$_2$/MAO 4.0 ml Mineral Oil | 0.28 | 1.0/(1.0) | 31 | 7 | 9 | 47 | 34.0 | 160000 | 0.30 | 133 | 87.0 | 2.3 |
| 4-2 | 250.0 mg solid FFZrCl$_2$/MAO 4.0 ml Mineral Oil 1.0 ml Hexane | 0.28 | 1.0/(1.0) | 25 | 4 | 6 | 35 | 29.0 | 125000 | 0.27 | 132 | 82.2 | 3.2 |

TABLE 4-continued

Effect of Method of Catalyst Addition to the Reactor
On Polymerizations Using Solid MAO/Metallocene Complex

| RUN | Bomb Contents | Metallocene amt, mg | MAO used/ (MAO std) | Powder Yield, g | Solid Fouling, g | Toluene ext, g | Total Yield, g | % Fouling | Cat. Effic g/g-h | Bulk den. | Tm, C | Mw/1000 (GPC) | MWD (GPC) |
|---|---|---|---|---|---|---|---|---|---|---|---|---|---|
| 4-3 | *250.0 mg solid FFZrCl$_2$/MAO 5.0 ml Mineral Oil 1.0 ml Hexane | 0.28 | 1.0/(1.0) | 41 | 1 | 3 | 45 | 9.0 | 160000 | 0.28 | 131 | 79.3 | 4.2 |
| 4-4 | *250.0 mg solid FFZrCl$_2$/MAO 4.0 ml Mineral Oil | 0.28 | 1.0/(1.0) | 30 | 2 | 3 | 35 | 14.0 | 125000 | 0.37 | 130 | 80.2 | 4.2 |

*Prepolymerization in reactor at 20° C. for 15 minutes and then the temperature increased to 60° C.

TABLE 5

Effective of the Amount of Mineral Oil and Run Time On
Polymerizations Using a Solid MAO/Metallocene Complex in Mineral Oil

| RUN | Bomb Contents | Metallocene amt, mg | MAO used/ (MAO std) | Powder Yield, g | Solid Fouling, g | Toluene ext, g | Total Yield, g | % Fouling | Cat. Effic g/g-h | Bulk den. | Tm, C | Mw/1000 (GPC) | MWD (GPC) |
|---|---|---|---|---|---|---|---|---|---|---|---|---|---|
| 5-1 | 400.0 mg[1] solid FFZrCl$_2$/MAO/ LiCl 2.0 ml Mineral Oil | 0.40 | 1.0/1.0 | 68 | 12 | 9 | 89 | 24.0 | 220300 | 0.19 | 135 | | |
| 5-2 | 400.0 mg[2] solid FFZrCl$_2$/MAO/ LiCl 4.0 ml Mineral Oil | 0.40 | 1.0/1.0 | 57 | 11 | 8 | 76 | 24.0 | 188120 | 0.31 | 135 | | |
| 5-3 | 150.0 mg solid EIZ/MAO 4.0 ml Mineral Oil 1.0 ml Hexane | 0.56 | 0.3/(1.0) | 88 | 3 | 11 | 102 | 14.0 | 182000 | 0.42 | 131 | | |
| 5-4 | 150.0 mg[3] solid EIZ/MAO 5.0 ml Mineral Oil | 0.56 | 0.3/(1.0) | 78 | 1 | 9 | 88 | 11.0 | 157000 | 0.42 | 129 | | |
| 5-5* | 100.0 mg solid FFZrCl1/MAO | 0.37 | 0.3/(1.0) | 81 | 3 | 6 | 90 | 10.0 | 120640 | 0.38 | 132 | | |
| 5-6 | 150.0 mg solid di-t-Bu/MAO 4.0 ml Mineral Oil | 0.56 | 0.3/(1.0) | 36 | 0 | 1 | 37 | 3.0 | 66070 | 0.18 | 133 | | |
| 5-7* | 150.0 mg solid Di-t-Bu/MAO 4.0 ml Mineral Oil | 0.56 | 0.3/(1.0) | 75 | 1 | 1 | 77 | 3.0 | 137500 | 0.18 | 136 | | |
| 5-8 | 150.0 mg EIZ/MAO 4.0 ml Mineral Oil | 0.56 | 0.3/(1.0) | 88 | 3 | 11 | 102 | 14.0 | 182000 | 0.42 | 131 | | |
| 5-9 | 75.0 mg solid EIZ/MAO 4.0 ml Mineral Oil | 0.28 | 0.3/(1.0) | 63 | < | 5 | 68 | 7.0 | 121400 | 0.44 | 130 | | |

[1]Add catalyst to bomb; top off with mineral oil.
[2]Add catalyst to bomb; top off with mineral oil.
[3]Add catalyst to bomb; top off with 5 ml mineral oil.
*Polymerization time was 120 minutes.

TABLE 6

Effect of Temperature on Polymerizations Using a Solid
MAO/Metallocenes Complex Suspended in Mineral Oil

| RUN | Bomb Contents | Metallocene amt, mg | MAO used/ (MAO std) | Powder Yield, g | Solid Fouling, g | Toluene ext, g | Total Yield, g | % Fouling | Cat. Effic g/g-h | Bulk den. | Tm, C | Mw/1000 (GPC) | MWD (GPC) |
|---|---|---|---|---|---|---|---|---|---|---|---|---|---|
| 6-1 | 150.0 mg solid di-t-Bu/MAO 4.0 ml Mineral Oil | 0.56 | 0.3/(1.0) | 36 | 0 | 1 | 37 | 3 | 66070 | 0.18 | 133 | 63 | 2.7 |
| 6-2 | *150.0 mg solid di-t-Bu/MAO 4.0 ml Mineral Oil | 0.56 | 0.3/(1.0) | 47 | 0 | 3 | 50 | 6 | 89290 | 0.25 | 133 | 57 | 3.0 |
| 6-3 | **150.0 mg solid di-t-Bu/MAO 4.0 ml Mineral Oil | 0.56 | 0.3/(1.0) | 59 | 6 | 10 | 75 | 21 | 124000 | 0.45 | 132 | 55 | 2.6 |
| 6-4 | *150.0 mg solid FFZrCl$_2$/MAO 4.0 ml Mineral Oil | 0.56 | 0.3/(1.0) | 70 | 11 | 11 | 92 | 24 | 164300 | 0.36 | 130 | | |
| 6-5 | 100.0 mg solid FFZrCl$_2$/MAO 4.0 ml Mineral Oil | 0.37 | 0.3/(1.0) | 74 | 6 | 7 | 87 | 15 | 117600 | 0.39 | 131 | 79 | 2.6 |
| 6-6 | 75.0 mg solid FFZrCl$_2$/MAO 4.0 ml Mineral Oil | 0.28 | 0.3/(1.0) | 25 | 2 | 5 | 27 | 26 | 96400 | 0.22 | 130 | 70 | 3.6 |

*Polymerization temperature was 65° C.
**Polymerization temperature was 70° C.

TABLE 7

Polymerizations With Isospecific Metallocenes Using
Solid MAO/Metallocenes Complex Suspended in Mineral Oil

| RUN | Bomb Contents | Metallocene amt, mg | MAO used/ (MAO std) | Powder Yield, g | Solid Fouling, g | Toluene ext, g | Total Yield, g | % Fouling | Cat. Effic g/g-h | Bulk den. | Tm, C | Mw/1000 (GPC) | MWD (GPC) |
|---|---|---|---|---|---|---|---|---|---|---|---|---|---|
| 7-1 | 150.0 mg solid EIZ/MAO 4.0 ml Mineral Oil | 0.56 | 0.3/(1.0) | 88 | 3 | 11 | 102 | 14.0 | 182000 | 0.42 | 131 | 25 | 2.2 |
| 7-2 | 150.0 mg solid EIZ/MAO 4.0 ml Mineral Oil TEAl - 2 mmol | 0.56 | 0.3/(1.0) | 24 | 0 | 8 | 32 | 25.0 | 57140 | 0.26 | 127 | 27 | 2.3 |
| 7-3 | 150.0 mg solid EIZ/MAO 5.0 ml Mineral Oil | 0.56 | 0.3/(1.0) | 78 | 1 | 9 | 88 | 11.0 | 157000 | 0.42 | 129 | 24 | 2.3 |
| 7-4 | *75.0 mg solid EIZ/MAO 4.0 ml Mineral Oil | 0.28 | 0.3/(1.0) | 63 | | 5 | 68 | 7.0 | 121400 | 0.44 | 130 | 22 | 2.4 |

*Polymerization time 120 minutes

TABLE 8

Effect of Metallocene Structure on
On Polymerizations Using Solid MAO/Metallocene Complex
Suspended in Mineral Oil

| RUN | Bomb Contents | Metallocene amt, mg | MAO used/ (MAO std) | Powder Yield, g | Solid Fouling, g | Toluene ext, g | Total Yield, g | % Fouling | Cat. Effic g/g-h | Bulk den. | Tm, C | Mw/1000 (GPC) | MWD (GPC) |
|---|---|---|---|---|---|---|---|---|---|---|---|---|---|
| 8-1 | 150.0 mg solid FFZrCl$_2$/MAO 4.0 ml Mineral Oil | 0.56 | 0.3/(1.0) | 70 | 5 | 7 | 82 | 15.0 | 146400 | 0.29 | 133 | | |
| 8-2 | 150.0 mg solid FFZrCl$_2$/MAO 4.0 ml Mineral Oil | 0.56 | 0.3/(1.0) | 69 | 7 | 5 | 81 | 15.0 | 144600 | 0.32 | 132 | | |
| 8-3* | 100.0 mg solid FFZrCl$_2$/MAO 4.0 ml Mineral Oil | 0.37 | 0.3/(1.0) | 81 | 3 | 6 | 90 | 10.0 | 120640 | 0.38 | 132 | | |
| 8-4** | 150.0 mg solid FFZrCl$_2$/MAO 4.0 ml Mineral Oil | 0.56 | 0.3/(1.0) | 115 | 6 | 6 | 127 | 9.5 | 226800 | 0.36 | 131 | | |
| 8-5 | 150.0 mg solid di-t-Bu/MAO 4.0 ml Mineral Oil | 0.56 | 0.3/(1.0) | 36 | 0 | 1 | 37 | 3.0 | 66070 | 0.18 | 133 | 63 | 2.7 |
| 8-6** | 150.0 mg solid di-t-Bu/MAO 4.0 ml Mineral Oil | 0.56 | 0.3/(1.0) | 47 | 0 | 3 | 50 | 6.0 | 89290 | 0.25 | 133 | 57 | 3.0 |
| 8-7*** | 150.0 mg solid di-t-Bu/MAO 4.0 ml Mineral Oil | 0.56 | 0.3/(1.0) | 59 | 6 | 10 | 75 | 21.0 | 134000 | 0.45 | 132 | 55 | 2.6 |
| 8-8* | 150.0 mg solid di-t-Bu/MAO 4.0 ml Mineral Oil | 0.56 | 0.3/(1.0) | 75 | 1 | 1 | 77 | 3.0 | 137500 | 0.18 | 136 | 63 | 2.6 |

*Polymerization time was 120 minutes
**Polymerization temperature was 65° C.
***Polymerization temperature was 70° C.

Abbreviations Used in the Tables

FFZrCl$_2$—isopropyl(fluorenyl)(cyclopentadienyl) zirconium dichloride
MAO—methylalumoxane
di-t-Bu—isopropyl(2,7-di-t-butylfluorenyl)(cyclopentadienyl) zirconium dichloride
TEAL—Triethylaluminum
EIZ—ethylene bis(indenyl)zirconium dichloride Increasing the MAO/metallocene ratio in a homogeneous metallocene catalyst sharply increases polymer yield. Ultimately, the polymer yield reaches maximum and then levels off. This ratio of MAO to metallocene at which the polymer yield reaches maximum depends on the individual metallocene. For example, with syndiospecific metallocene catalysts of FFZrCl$_2$ type, Al/Zr ratio in the range of 1600–2000 is generally needed under homogeneous conditions to reach maximum polymer yields. The catalyst efficiency for this catalyst is approximately 300,000.

With solid MAO/metallocenes, there is a general decrease in catalyst efficiency even when same amount of MAO as under homogeneous conditions was used (Table 1). Part of this loss in catalyst efficiency is due to incomplete transfer of solids which remain stuck to the walls of the Wheaton bottles and catalyst transfer cylinder. Some of this efficiency loss can be recovered by using longer polymerization times (Compare Runs 1-5 versus 1-6). When the amount of MAO was reduced to ⅓ that of MAO used for homogeneous conditions, no significant loss in catalyst efficiency was noted. Thus, the same catalyst efficiency can be maintained using less of the expensive methyl alumoxane (Table 2). Addition of hexane to mineral oil slurry of the catalyst systems generally resulted in decreased polymer yields. This might be due to solid settlement in a less viscous medium resulting in catalyst loss during transfer. Another general observation with the solid MAO/metallocene systems is that better catalyst efficiencies are observed when larger amounts of MAO/metallocene solid mixture was used. This may be again due to the fact that if same amount of solid is lost in all cases, such loss would represent a greater proportion of smaller quantities of a solid relative to that of a larger sample. Bulk densities (0.29–0.38) are higher and % fouling is lower (6–15%) for polymerizations using less MAO (Table 1).

Additional MAO in toluene was added to the reactor either before or after the addition of the mineral oil slurry of the MAO/metallocene mixture containing only ⅓ of MAO normally used. Polymerization results (Table 2) suggest that polymer yields using only ⅓ MAO are almost same as those using MAO equivalent to homogeneous systems (compare catalyst efficiencies for Run 2-1 and Run 2-2 with Run 2-3 and Run 2-4). However, the fouling was much worse when additional MAO in toluene was added (45–56% vs 15%). Bulk density of the polymer did not vary significantly; however, when more MAO in toluene solution was added, the molecular weight distribution increased significantly.

The results of modification to catalyst delivery into the reactor are summarized in Table 4. The extent of reactor fouling, the polymer bulk densities and polymer yields depend on the method of catalyst delivery and preparation. Use of hexane/mineral oil mixtures resulted in lower catalyst efficiencies. Initial low temperature prepolymerization yield better bulk densities. Initial addition of solid catalyst to the catalyst transfer bomb followed by addition of mineral oil give excellent polymer yields. Increasing the amount of mineral oil generally increased the bulk densities. The data listed in Table 4 for runs 4-3 and 4-4 were obtained using in situ prepolymerization method.

Data from the addition of solid MAO/metallocene mixture as a slurry of mineral oil alone or as mineral oil and hexane mixture (Run 4-1 vs Run 4-2) shows that lower catalyst efficiencies are realized when hexane was used. Bulk densities, % fouling and polymer melting point did not vary significantly under these conditions. Loss in catalyst efficiency observed when hexane and mineral oil slurry was used was regained along with decreased fouling by in situ prepolymerization for 10 minutes at 22° C. (Runs 4-2 and 4-3). Prepolymerization under same conditions without hexane resulted in decreased catalyst efficiencies, but also in decreased fouling (Runs 4-1 and 4-4). The bulk density of the polymer obtained under these conditions was significantly better. The bulk density increase may be partially due to the decreased polymer melting point. It is a common observation with metallocenes that experimental conditions such as polymerization temperature which give lower polymer melting points also give polymers with higher bulk densities.

The parameter of mineral oil volume suggests that increasing the volume of mineral oil decreases catalyst efficiency, increases bulk density and appears to have a slight decreasing effect on fouling (Table 5). The results from varying the duration of polymerization time generally show an increase in polymer yields with increased polymerization duration. Therefore, increasing the polymerization duration can compensate for increased mineral oil volume.

Melting points and molecular weights of polypropylene obtained with methyl alumoxane (MAO) solutions of metallocenes depend on the polymerization temperature. In general, polymer melting points and molecular weights decrease with increase in polymerization temperature, but polymer yields are higher at higher polymerization temperatures. Using solid MAO/metallocene mixtures obtained by removing solvent from the corresponding solutions, it was found that polymer melting points are much less sensitive to the polymerization temperature and did not decrease significantly with increase in polymerization temperature (Table 6). However, the polymer yields did increase with increase in polymerization temperature. It is a significant advance in metallocene based catalyst system to be able to increase polymer yields at higher processing temperatures without a decrease in polymer melting points.

The effect of temperature on polymerizations with mineral oil slurry of solid MAO/metallocene mixtures with di-t-Bu at three different temperatures and with FFZrCl$_2$ at two different temperatures showed the effect of polymerization temperature on polymer melting point for solid MAO/metallocene systems is strikingly different from that resulting from the same metallocene under homogeneous conditions. The melting point of polymer obtained with the di-t-Bu catalyst appears to be insensitive to polymerization temperature. Results are shown in Table 6. Polymer melting point appears to be somewhat insensitive to polymerization temperature at least in the range 60–70° C. This behavior is similar to the heterogeneous Ziegler-Natta systems. Higher polymerization temperatures for metallocene catalysts generally provide higher bulk densities even though there is a parallel increase in fouling.

The method of using mineral slurry of solid MAO/metallocene mixture as a way of catalyst delivery into the reactor can be extended to isospecific metallocenes (Table 7). The polymer bulk densities are consistently in the range of 0.40–0.44 which coincidentally is identical to the range of polymer bulk densities obtained with conventional Ziegler-Natta catalysts. Again as seen with syndiospecific metallocene, the catalyst efficiencies are lower than those observed under homogeneous conditions. Fouling is also decreased substantially with this method. There was no significant change in the polymer melting point relative to that observed under homogeneous conditions.

Two metallocenes, isopropyl(cyclopentadienyl)(fluorenyl) zirconium dichloride and isopropyl (cyclopentadienyl)(2,7-di-t-butyl fluorenyl)zirconium dichloride, were compared under similar polymerization conditions. The catalyst efficiency of the latter catalyst was lower than that of the former as was observed under homogeneous conditions (Table 8). The effect of substituents on the fluorenyl ring on polymer melting points has been disclosed in U.S. Ser. No. 903,058 filed Jun. 22, 1992, hereby incorporated by reference. Bulk density of the polymer obtained at 70° C. with the di-t-butyl catalyst was the highest value recorded for syndiotactic polypropylene with a melting point of 132° C.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A process for preparing a catalyst system comprising:
   a) reacting at least one metallocene of the general formula:

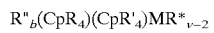

$R''_b(CpR_4)(CpR'_4)MR^*_{v-2}$ where R" is a bridge imparting stereorigidity to the structure of the metallocene by connecting the two cyclopentadienyl rings, b is 0 or 1, Cp is a cyclopentadienyl ring, R and R' are substituents on the cyclopentadienyl rings and can be a hydride or a hydrocarbyl from 1–9 carbon atoms, each R and R' being the same or different, each (CpR$_4$) and (CpR'$_4$) being the same or different, M is a transition metal of a Group IIIB, IVB, VB or VIB metal, R* is a hydride, a halogen or a hydrocarbyl from 1–20 carbon atoms, v is the valence of M with an aluminoxane in a solvent consisting of toluene,
   b) removing the toluene from the mixture of metallocene and aluminoxane to obtain a solid reaction product;
   c) grinding the solid reaction product to form a free flowing powder;
   d) suspending the solid reaction product in mineral oil to obtain a slurry.

2. The process of claim 1 wherein the alumoxane is of the general formula:

$$Al_2OR_4(Al(R)-O)_n$$

for a linear aluminoxane and $$(Al(R)-O)_{n+2}$$

for a cyclic aluminoxane, n being 4 to 20 and R being methyl or ethyl.

3. The process of claim 1 wherein the alumoxane is methylalumoxane.

4. The process of claim 1 wherein b is 1.

5. The process of claim 1 wherein R" is a hydrocarbyl radical.

6. The process of claim 1 wherein R" is an alkenyl radical having one to four carbon atoms, a dialkyl germanium, a dialkyl silicon, an alkyl phosphine or amine radical.

7. The process of claim 1 wherein R" is a dimethyl silyl radical, an ethylenyl radical or a isopropenyl radical.

8. The process of claim 1 wherein $(CpR_4)$ is cyclopentadienyl or a substituted cyclopentadienyl ring chosen from the group consisting of 3-t-butyl-cyclopentadienyl and indenyl and $(CpR'_4l)$ is a substituted cyclopentadienyl ring chosen from the group consisting of indenyl and fluorenyl.

9. The process of claim 1 wherein M is a Group IVB metal.

10. The process of claim 9 wherein M is zirconium.

11. The process of claim 1 wherein $R^*$ is a halogen or alkyl.

12. The process of claim 11 wherein $R^*$ is chlorine or methyl.

13. The process of claim 1 wherein the metallocene is isopropyl (fluorenyl)(cyclopentadienyl)zirconium dichloride.

14. The process of claim 1 wherein the metallocene is isopropyl (2,7-di-t-butylfluorenyl)(cyclopentadienyl) zirconium dichloride.

15. The process of claim 1 wherein the metallocene is ethylene bis(indenyl)zirconium dichloride.

16. The process of claim 1 wherein the aluminum to transition metal molar ratio is about 1000:1 to about 4000:1.

17. A catalyst for the polymerization of olefins comprising a mixture of:

a) at least one metallocene represented by the formula:

$$R"_b(CpR_4)(CpR'_4)MR^*_{v-2}$$

where R" is a bridge imparting stereorigidity to the structure to the metallocene by connecting the two cyclopentadienyl rings, b is 0 or 1, Cp is a cyclopentadienyl ring, R and R' are substituents on the cyclopentadienyl rings and can be a hydride or a hydrocarbyl from 1–9 carbon atoms, each R and R' being the same or different, each $(CpR_4)$ and $(CpR'_4)$ being the same or different, M is a transition metal of a Group IIIB, IVB, VB or VIB metal of the Periodic Table, $R^*$ is a hydride, a halogen or a hydrocarbyl from 1–20 carbon atoms, v is the valence of M;

b) an alumoxane of the general formula:

$$Al_2OR_4(Al(R)-O)_n$$

for a linear aluminoxane and $$(Al(R)-O)_{n+2}$$

for a cyclic aluminoxane, n being 4 to 20 and R being methyl or ethyl;

in a solvent consisting of toluene, wherein the toluene has been removed from the mixture of metallocene and aluminoxane to obtain a solid reaction product, and c) mineral oil as a suspension media for the solid reaction product.

18. The catalyst of claim 17 wherein the alumoxane is methylalumoxane.

19. The catalyst of claim 17 wherein b is 1.

20. The catalyst of claim 17 wherein R" is a hydrocarbyl radical.

21. The catalyst of claim 17 wherein R" is an alkenyl radical having one to four carbon atoms, a dialkyl germanium, a dialkyl silicon, an alkyl phosphine or amine radical.

22. The catalyst of claim 21 wherein R" is a dimethyl silyl radical, an ethylenyl radical or a isopropenyl radical.

23. The catalyst of claim 17 wherein $(CpR_4)$ is cyclopentadienyl or a substituted cyclopentadienyl ring chosen from the group consisting of 3-t-butyl-cyclopentadienyl and indenyl and $(CpR'_4)$ is a substituted cyclopentadienyl ring chosen from the group consisting of indenyl and fluorenyl.

24. The catalyst of claim 17 wherein M is a Group IVB metal.

25. The catalyst of claim 24 wherein M is zirconium.

26. The catalyst of claim 17 wherein $R^*$ is a halogen or alkyl.

27. The catalyst of claim 17 wherein $R^*$ is chlorine or methyl.

28. The catalyst of claim 17 wherein the metallocene is isopropyl(fluorenyl)(cyclopentadienyl)zirconium dichloride.

29. The catalyst of claim 17 wherein the metallocene is isopropyl (2,7-di-t-butylfluorenyl)(cyclopentadienyl) zirconium dichloride.

30. The catalyst of claim 17 wherein the metallocene is ethylene bis(indenyl)zirconium dichloride.

31. The catalyst of claim 17 wherein the aluminum to transition metal molar ratio is about 1000:1 to about 4000:1.

32. A process for preparing a catalyst system consisting of:

a) reacting at least one metallocene of the general formula:

$$R"_b(CpR_4)(CpR'_4)MR^*_{v-2}$$

where R" is a bridge imparting stereorigidity to the structure of the metallocene by connecting the two cyclopentadienyl rings, b is 0 or 1, Cp is a cyclopentadienyl ring, R and R' are substituents on the cyclopentadienyl rings and can be a hydride or a hydrocarbyl from 1–9 carbon atoms, each R and R' being the same or different, each $(CpR_4)$ and $(CpR'_4)$ being the same or different, M is a transition metal of a Group IIIB, IVB, VB or VIB metal, $R^*$ is a hydride, a halogen or a hydrocarbyl from 1–20 carbon atoms, v is the valence of M with an aluminoxane in toluene, b) removing the toluene from the mixture of metallocene and aluminoxane to obtain a solid reaction product;

c) suspending the solid reaction product in mineral oil to obtain a slurry.

33. A process for preparing a catalyst system consisting of a) reacting at least one metallocene of the general formula:

$$R"_b(CpR_4)(CpR'_4)MR^*_{v-2}$$

where R" is a bridge imparting stereorigidity to the structure of the metallocene by connecting the two cyclopentadienyl rings, b is 0 or 1, Cp is a cyclopentadienyl ring, R and R' are substituents on the cyclopentadienyl rings and can be a hydride or a hydrocarbyl from 1–9 carbon atoms, each R and R' being the same or different, each $(CpR_4)$ and $(CpR'_4)$ being the same or different, M is a transition metal of a Group IIIB, IVB, VB or VIB metal, R* is a hydride, a halogen or a hydrocarbyl from 1–20 carbon atoms, v is the valence of M with an aluminoxane in toluene, b) removing the toluene from the mixture of metallocene and aluminoxane to obtain a solid reaction product;

c) grinding the solid reaction product to form a free flowing powder;

d) suspending the solid reaction product in mineral oil to obtain a slurry.

* * * * *